US007260999B2

(12) United States Patent
Divigalpitiya et al.

(10) Patent No.: US 7,260,999 B2
(45) Date of Patent: Aug. 28, 2007

(54) FORCE SENSING MEMBRANE

(75) Inventors: Ranjith Divigalpitiya, London (CA); Pei-Jung Chen, London (CA); David A. Kanno, London (CA); Gabriella Miholics, London (CA); Vijay Patel, London (CA); Matthew T. Scholz, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 11/020,289

(22) Filed: Dec. 23, 2004

(65) Prior Publication Data

US 2006/0137462 A1 Jun. 29, 2006

(51) Int. Cl.
*G01B 7/16* (2006.01)

(52) U.S. Cl. ........................................ 73/774

(58) Field of Classification Search ................ 310/120; 73/774

See application file for complete search history.

(56) References Cited

U.S. PATENT DOCUMENTS

| | | | |
|---|---|---|---|
| 3,475,213 A | 10/1969 | Stow | |
| 3,699,294 A | 10/1972 | Sudduth | |
| 3,879,618 A | 4/1975 | Larson | |
| 4,098,945 A | 7/1978 | Oehmke | |
| 4,164,634 A | 8/1979 | Gilano | |
| 4,317,013 A | 2/1982 | Larson | |
| 4,385,215 A | 5/1983 | Lemberg | |
| 4,421,958 A | 12/1983 | Kameda | |
| 4,575,580 A | 3/1986 | Jandrell | |
| RE32,180 E * | 6/1986 | Lewiner et al. | 340/573.1 |
| 4,644,101 A | 2/1987 | Jin et al. | |
| 4,775,765 A | 10/1988 | Kimura et al. | |
| 4,801,771 A | 1/1989 | Mizuguchi et al. | |
| 4,829,349 A | 5/1989 | Luryi | |
| 4,914,416 A | 4/1990 | Kunikane | |
| 4,963,417 A | 10/1990 | Taniguchi et al. | |
| 5,209,967 A | 5/1993 | Wright et al. | |
| 5,243,162 A | 9/1993 | Kobayashi | |

(Continued)

FOREIGN PATENT DOCUMENTS

DE 41 14 701 A1 11/1992

(Continued)

OTHER PUBLICATIONS

Fulton et al., Electrical and Mechanical Properties of a Metal-Filled Polymer Composite for Interconnection and Testing Applications, AT&T Bell Laboratories, 0569-5503/89/0071.

*Primary Examiner*—Max Noori
(74) *Attorney, Agent, or Firm*—Lisa P. Fulton

(57) ABSTRACT

A force sensing membrane comprises (a) a first conductor that is movable toward a second conductor; (b) a second conductor; and (c) a composite material disposed between the first and second conductors for electrically connecting the first and second conductors under application of sufficient pressure therebetween; and (d) means for measuring dynamic electrical response across the force sensing membrane, the composite material comprising conductive particles at least partially embedded in an elastomeric layer, the conductive particles having no relative orientation and being disposed so that substantially all electrical connections made between the first and second conductors are in the z direction, and the elastomeric layer being capable of returning to substantially its original dimensions on release of pressure.

43 Claims, 5 Drawing Sheets

U.S. PATENT DOCUMENTS

| | | | | |
|---|---|---|---|---|
| 5,296,837 | A | 3/1994 | Yaniger | |
| 5,302,936 | A | 4/1994 | Yaniger | |
| 5,371,327 | A | 12/1994 | Fujinami et al. | |
| 5,593,395 | A * | 1/1997 | Martz | 604/304 |
| 5,898,426 | A | 4/1999 | Kim | |
| 5,925,001 | A * | 7/1999 | Hoyt et al. | 600/595 |
| 5,986,223 | A | 11/1999 | Kim | |
| 5,995,198 | A | 11/1999 | Mizutani | |
| 5,997,996 | A | 12/1999 | Tamura | |
| 6,073,497 | A | 6/2000 | Jiang et al. | |
| 6,078,274 | A | 6/2000 | Inou | |
| 6,088,024 | A | 7/2000 | Yamagata | |
| 6,114,645 | A | 9/2000 | Burgess | |
| 6,118,435 | A | 9/2000 | Fujita et al. | |
| 6,121,869 | A | 9/2000 | Burgess | |
| 6,287,253 | B1 | 9/2001 | Ortega et al. | |
| 6,296,066 | B1 * | 10/2001 | Terry et al. | 175/92 |
| 6,310,614 | B1 | 10/2001 | Maeda et al. | |
| 6,369,803 | B2 | 4/2002 | Brisebois et al. | |
| 6,441,118 | B2 | 8/2002 | Sherman et al. | |
| 6,569,494 | B1 | 5/2003 | Chambers et al. | |
| 6,809,280 | B2 | 10/2004 | Divigalpitiya et al. | |
| 6,815,874 | B2 | 11/2004 | Hermle et al. | |
| 6,832,522 | B2 * | 12/2004 | Schaefer et al. | 73/715 |
| 2001/0000915 | A1 * | 5/2001 | Katchmar | 257/1 |
| 2002/0119255 | A1 | 8/2002 | Divigalpitiya et al. | |
| 2003/0129302 | A1 | 7/2003 | Chambers et al. | |
| 2003/0178221 | A1 | 9/2003 | Chiu et al. | |
| 2003/0205450 | A1 | 11/2003 | Divigalpitiya et al. | |
| 2004/0109096 | A1 | 6/2004 | Anderson et al. | |

FOREIGN PATENT DOCUMENTS

| | | | |
|---|---|---|---|
| EP | 1 172 831 | A2 | 1/2002 |
| GB | 2 049 290 | A | 12/1980 |
| GB | 2 134 322 | A | 8/1984 |
| GB | 2 233 499 | A | 1/1991 |
| JP | 59-188726 | | 10/1984 |
| JP | 60-65406 | | 4/1985 |
| JP | 1-132017 | | 5/1989 |
| JP | 5-143219 | | 6/1993 |
| JP | 7-219697 | | 8/1995 |
| JP | 7-296672 | | 11/1995 |
| JP | 2000-029612 | | 1/2000 |
| JP | 2001-228975 | | 8/2001 |
| WO | WO 00/00563 | | 1/2000 |
| WO | WO 03/094186 | A1 | 11/2003 |

* cited by examiner

FORCE SENSING MEMBRANE

FIELD

This invention relates to force sensing membranes, to devices comprising the force sensing membranes, and to methods of force sensing using the force sensing membranes.

BACKGROUND

Force sensing membranes are used in various applications to detect contact/touch, detect and measure a relative change in force or applied load, detect and measure the rate of change in force, and/or detect the removal of a force or load.

Force sensing membranes typically consist of an elastomer comprising conductive particles (the "elastomeric layer") positioned between two conducting contacts. When pressure is applied to one of the conducting contacts, the conducting contact is pressed against the surface of the elastomeric layer, and conduction paths are created. The conduction paths are made up of chains of the conductive particles that make a tortuous path through the elastomer. Therefore, the concentration of conductive particles in the elastomer must be above a certain threshold (that is, above the percolation threshold) to make a continuous path. As pressure is increased, greater numbers and regions of contact between the conducting contact and the elastomeric layer's surface are created. Thus, a greater number of conduction paths through the elastomer and conductive particles are created, and the resistance across the elastomer layer is decreased.

SUMMARY

In view of the foregoing, we recognize that because the conduction paths in force sensing membranes of the prior art are made up of many conductive particle contacts, variations in resistance and hysteresis can result.

Briefly, in one aspect, the present invention provides force sensing membranes wherein the concentration of conducting particles are less than the percolation threshold, and substantially all conduction paths are through single particles. The force sensing membranes comprise (a) a first conductor that is movable toward a second conductor, (b) a second conductor, (c) a composite material disposed between the first and second conductors for electrically connecting the first and second conductors under application of sufficient pressure therebetween, and (d) means for measuring dynamic electrical response (for example, resistance, conductance, current, voltage, and the like) across the force sensing membrane. As used herein, "means for measuring 'dynamic' electrical response" includes any means for measuring electrical response that measures more than merely off/on.

The composite material comprises conductive particles at least partially embedded in an elastomeric layer. The conductive particles have no relative orientation and are disposed so that substantially all electrical connections made between the first and second conductors are in the z direction (that is, substantially all electrical connections are in the thickness direction of a relatively planar structure, not in the in-plane (x-y) direction).

The elastomeric layer is capable of returning to substantially its original dimensions on release of pressure. As used herein, "capable of returning to substantially its original dimensions" means that the layer is capable of returning to at least 90 percent (preferably at least 95 percent; more preferably, at least 99 percent; most preferably 100 percent) of its original thickness within, for example, 10 seconds (preferably, within 1 second or less).

In another aspect, the present invention provides a force sensing membrane comprising (a) an elastomeric layer disposed on a first conductor, and (b) a composite layer comprising conductive particles at least partially embedded in an insulating material disposed on a second conductor. At least one of the first and second conductors is movable toward the other conductor (that is, either the first conductor is movable toward the second conductor, or the second conductor is movable toward the first conductor, or both conductors are movable toward each other).

The conductive particles electrically connect the first and second conductors under application of sufficient pressure therebetween. The conductive particles have no relative orientation and are disposed so that substantially all electrical connections made between the first and second conductors are in the z direction.

The elastomeric layer is capable of returning to substantially its original dimensions on release of pressure.

The force sensing membranes of the invention therefore meet the need in the art for force sensing membranes with less variations in resistance and hysteresis than those made up of many conductive particle contacts.

In yet another aspect, the present invention provides methods of force sensing using the force sensing membranes of the invention.

Figure 1:
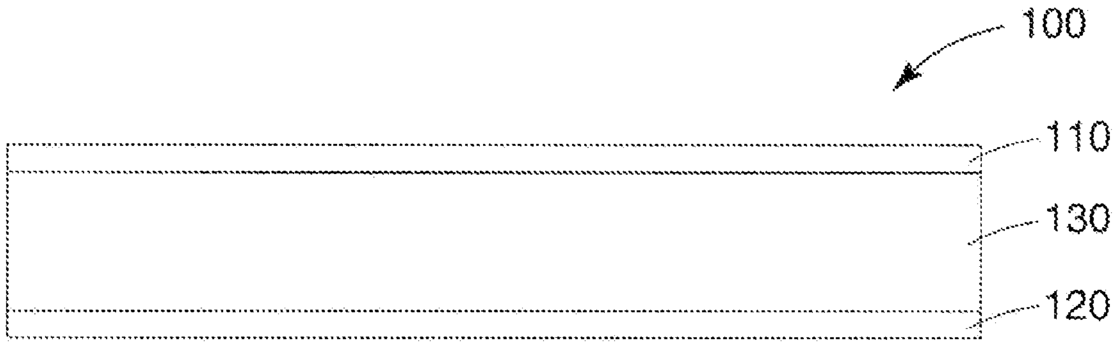
FIG. 1 is a schematic side view of a force sensing membrane.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The force sensing membranes of the invention can be used in various applications to detect contact/touch, detect and measure a relative change in force or applied load, detect and measure the rate of change in force, and/or detect the removal of a load or force.

When sufficient pressure is applied to a force sensing membrane of the present invention, electrical contact is made between the conductors. For a broad range of pressures, the resistance (R) of the force sensing membranes typically varies with pressure (P) according to the relationship:

$$R \approx 1/P^n$$

wherein n is close to unity. Therefore, when R versus P is plotted on a log-log scale, a straight line can be obtained. Thus, the force sensing membranes of the invention are sensitive force/pressure sensors over a wide dynamic range of pressure. The variable resistance can be read out using any suitable means (for example, with an ohm meter, an array of light emitting diodes (LEDs), or audio signals with the appropriate circuitry).

To make electrical contact between the conductors, the present invention employs conductive particles preferably distributed between the conductors in such a manner that substantially all electrical contacts are through one or more single particles (that is, both conductors are in simultaneous electrical contact with the same particle or particles). The conductive particles are at least partially embedded in an elastomeric material. The elastomeric material allows for electrical contacts through greater numbers of conductive particles and for contact over greater regions of the conductive particles as pressure is increased. The elastomeric material also allows for the electrical connection to be broken when sufficient pressure between the conductors no longer exists. For example, the elastomeric material can be a resilient material that can be deformed to allow electrical contact to be made upon the application of pressure, and that returns the conductors to their initial separated positions when no pressure is applied. The deformation of the elastomeric material will increase or decrease as the application of pressure is increased or decreased.

Distributing the conductive particles so that electric contacts are made via one or more single particles can have several benefits. Because the conductors are in electrical contact via single particles, there are at most only two contact points to contribute to contact resistance for each particle contact (a conductive particle contacting the top conductor is one contact point, and the same conductive particle contracting the bottom conductor is another contact point), and this number of contact points remains consistent for each activation of a particular force sensing membrane. This can result in a relatively low contact resistance and a more consistent, reliable, and reproducible signal every time the force sensing membrane is activated. Lower contact resistance gives rise to less signal loss, which ultimately results in a higher signal to noise ratio, which can result in more accurate force or pressure determinations in force sensor devices.

Another advantage of single particle electrical contacts is the absence of particle alignment requirements and preferred particle-to-particle orientations. For example, application of a magnetic field during manufacturing is not required to orient and align the particles, making manufacturing easier and less costly. In addition, when magnetic alignment is used, the conductive particles span the entire thickness of the resulting film, requiring another insulating layer to be applied so that the overall construction is not conductive in the absence of pressure. The absence of particle alignment requirements can also improve durability relative to devices that employ aligned wires or elongated rods vertically oriented in the thickness direction of the device that can be subject to bending and breaking upon repeated activation and/or relatively high applied forces. The absence of particle alignment and orientation requirements makes the force sensing membranes of the present invention particularly suitable for applications where the membrane is to be mounted in curved, irregular, or otherwise non-flat configurations.

Force sensing membranes of the present invention can also be made very thin (for example, between about 1 μm and about 500 μm; preferably, between about 1 μm and about 50 μm) because the gap between the conductors at their rest state (that is, with no externally applied pressure) need only be slightly larger than the largest conductive particles disposed between the conductors. As such, relatively low particle loadings can be used while still maintaining reliable performance and sufficient resolution. The particles can also be distributed so that the activation force (that is, the force required to activate the force sensing membrane) is uniform across the surface of the membrane. The ability to use lower particle density can also be a cost advantage because fewer particles are used.

FIG. 1 shows a force sensing membrane 100 that includes a first conductor in the form of a conductive layer 110, a second conductor in the form of a second conductive layer 120, a composite material 130 between the first and second conductive layers, and means for measuring electrical response (shown here as resistance) across the force sensing membrane 100. At least one of conductive layers 110 and 120 is movable with respect to the second conductive layer, for example, by application of external pressure. The composite material 130 has conductive particles wholly or partially embedded in an insulating elastomeric material. By insulating, it is meant that the material is sufficiently less conductive than the particles and the conductors so that the electrical connection made upon application of pressure is substantially reduced when no pressure is applied. As used herein, "insulating" materials have a resistivity greater than about $10^9$ ohms.

Either of the conductive layers 110 or 120 can be a conductive sheet, foil, or coating. The material(s) of the conductive layers can include any suitable conductive materials such as, for example, metals, semiconductors, doped semiconductors, semi-metals, metal oxides, organic conductors and conductive polymers, and the like, and mixtures thereof. Suitable inorganic materials include, for example, copper, gold, and other metals or metal alloys commonly used in electronic devices, as well as transparent conductive materials such as transparent conductive oxides (for example, indium tin oxide (ITO), antimony tin oxide (ATO), and like). Suitable organic materials include, for example, conductive organic metallic compounds as well as conductive polymers such as polypyrrole, polyaniline, polyacetylene, polythiophene, and materials such as those disclosed in European Patent Publication EP 1172831.

For some applications (for example, healthcare/medical applications) it is preferable that the conductive layers be permeable to moisture vapor. Preferably, the moisture vapor transmission rate (MVTR) of the conductive layer is at least about 400 g water/$m^2$/24 hours (more preferably, at least about 800; even more preferably, at least about 1600; most preferably, at least about 2000) when measured using a water method according to ASTM E-96-00.

A means for measuring dynamic electrical response across the force sensor (not shown in FIG. 1) can be electrically connected to conductive layers 110 and 120. Suitable means for measuring dynamic electrical response include, for example, ohmmeters and multimeters. The dynamic electrical response can be read out, for example, on the ohmmeter or multimeter, or by any other suitable means (for example, an array of light emitting diodes (LEDs) or an audio signal).

The conductors can be self-supporting or can be provided on a substrate (not shown in FIG. 1). Suitable substrates can be rigid (for example, rigid plastics, glass, metals, or semiconductors) or flexible (for example, flexible plastic films, flexible foils, or thin glass. Substrates can be transparent or opaque depending upon the application.

The composite material disposed between the conductors includes conductive particles at least partially embedded in an elastomeric material. The conductive particles are disposed so that when pressure is applied to the device to move one conductor relative to the other, an electrical connection can be made through single particles contacting both of the conductors.

Figure 2A:
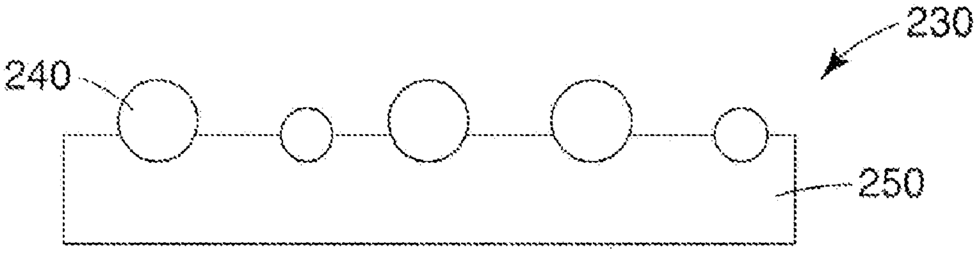
FIGS. 2(*a*) and (*b*) are schematic side views of composite materials useful in a force sensing membrane of the invention.
Figure 2B:
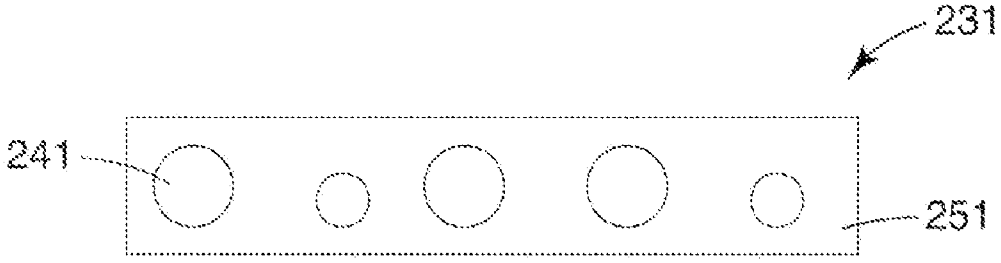
Figure 3A:
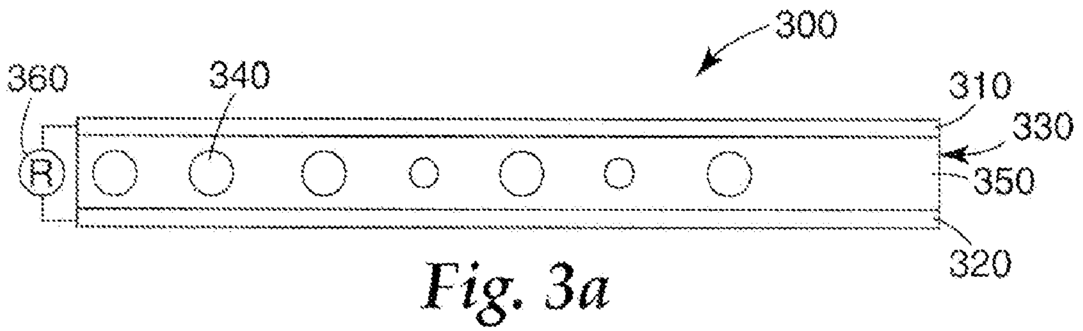
FIGS. 3(*a*), (*b*), (*c*), and (*d*) illustrate the use of a force sensing membrane of the invention using schematic side views of a force sensing membrane of the invention.
Figure 3B:
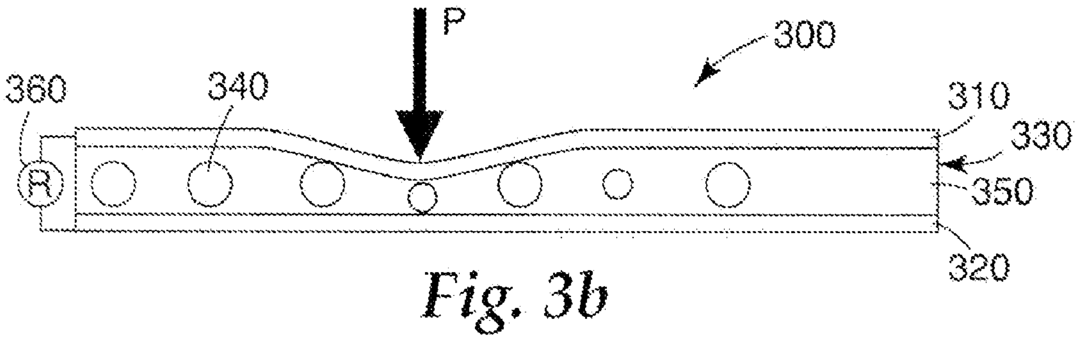
Figure 3C:
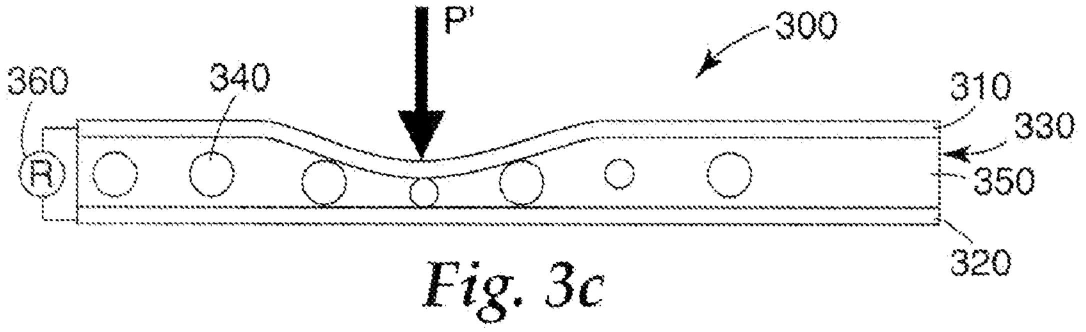
Figure 3D:
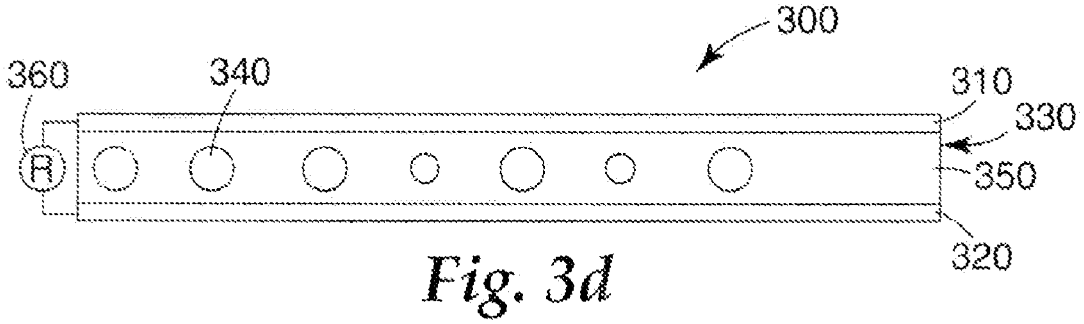

FIG. 2(*a*) shows one example of a composite material 230 that includes conductive particles 240 partially embedded in an elastomeric layer 250. FIG. 2(*b*) shows an example of another composite material 231 that includes conductive materials 241 completely embedded in an elastomeric layer 251. While FIGS. 2(*a*) and (*b*) serve to illustrate embodiments of a composite material useful in the present invention, any suitable arrangement where conductive particles are embedded fully or partially in any suitable ratio at any suitable position with respect to any particular surface of the elastomeric layer or material can be used. The present invention does not exclude composite materials having isolated instances where conductive particles overlap in the thickness direction of the device.

Preferably, the largest conductive particles are at least somewhat smaller than the thickness of the layer of elastomeric material, at least when the particle size is measured in the thickness direction of the composite. This can help prevent electrical shorting.

Suitable conductive particles include any suitable particles that have a contiguously conductive outer surface. For example, the conductive particles can be solid particles (for example, metallic spheres), solid particles coated with a conductive material, hollow particles with a conductive outer shell, or hollow particles coated with a conductive material. The conductive material can include, for example, metals, conductive metal oxides, organic conductors and conductive polymers, semiconductors, and the like, and mixtures thereof. The core of coated particles can be solid or hollow glass or plastic beads, ceramic particles, carbon particles, metallic particles, and the like, and mixtures thereof. The conductive particles can be transparent, semitransparent, colored, or opaque. They can have rough or smooth surfaces, and can be rigid or deformable.

The term "particles" includes spherical beads, elongated beads, truncated fibers, irregularly shaped particles, and the like. Generally, particles include particulate objects that have aspect ratios (that is, the ratio of the narrowest dimension to the longest dimension (for example, for a fiber the aspect ratio would be length: diameter) of 1:1 to about 1:20, and have characteristic dimensions in a range of about 1 μm to about 500 μm, depending upon the application. The conductive particles are dispersed in the composite material without any preferred orientation or alignment.

Suitable elastomeric materials include those that can maintain sufficient electrical separation between the conductors of force sensing membranes of the invention and that exhibit deformability and resiliency properties that allow the elastomeric material to be compressed to allow electrical contact of the conductors via one or more single particle contacts, to compress or deform in accordance with the amount of pressure applied, and to return the conductors to an electrically separated state when sufficient pressure is no longer being applied. Suitable elastomeric materials include, for example, both thermoplastic (linear or branched) and thermoset (crosslinked) polymers. Elastomeric materials can optionally include non-elastic polymers dispersed therein.

Preferably, the elastomeric material (in a fully cured state if a curable material) has a substantially constant storage modulus (G') over a large temperature range (more preferably, a substantially constant G' between about 0° C. and about 100° C.; most preferably, a substantially constant G' between about 0° C. and about 60° C.). As used herein, "substantially constant" means less than about 50 percent (preferably, less than 75 percent) variation. Preferably, the elastomeric material has a G' between about $1\times10^3$ Pa and about $9\times10^5$ Pa and a loss tangent (tan delta) between about 0.01 and about 0.60 at 1 Hz at 23° C. It is also preferable that the elastomeric material be self-healing (that is, capable of healing itself when cracked, punctured, or pierced). It is also preferable that the elastomeric material is not substantially affected by humidity.

Suitable elastomeric materials include, for example, natural and synthetic rubbers (for example, styrene butadiene rubber or butyl rubber, polyisoprene, polyisobutylene, polybutadiene, polychloroprene, acrylonitrile/butadiene as well as functionalized elastomers such as carboxyl or hydroxyl modified rubbers, and the like), acrylates, silicones including but not limited to polydimethylsiloxanes, styrenic block copolymers (for example, styrene-isoprene-styrene or styrene-ethylene/butylene-styrene block copolymer), polyurethanes including but not limited to those based on aliphatic isocyanate, aromatic isocyanate and combinations thereof, polyether polyols, polyester polyols, glycol polyols, and combinations thereof. Suitable thermoplastic polyurethane polymers are available from BF Goodrich under the Estane™ name. Thermoset formulations can also be used by incorporating polyols and/or polyisocyanates with an average functionality higher than two (for example, trifunctional or tetrafunctional components). Polyureas such as those formed by reaction of a polyisocyanate with a polyamine can also be suitable. Suitable polyamines can be selected from a broad class including polyether and polyester amines such as those sold by Huntsman under the Jeffamine™ name, and polyamine functional polydimethylsiloxanes such as those disclosed in U.S. Pat. No. 6,441,118 (Sherman et al.); elastomeric polyesters such as those by DuPont under the Hytrel™ name; certain metallocene polyolefins such as metallocene polyethylene (for example, Engage™ or Affinity™ polymers from Dow Chemical, Midland Mich.) can also be suitable. Fluorinated elastomers such as Viton™ from DuPont Dow Elastomers can also be suitable. The elastomeric materials can be modified, for example, with hydrocarbon resins (for example, polyterpenes) or extending oils (for example, naphthenic oils or plasticizers), or by the addition of organic or inorganic fillers such as polystyrene particles, clays, silica, and the like. The fillers can have a particulate or fibrous morphology. Preferably, the elastomeric material comprises a silicone (preferably a moisture cure thermoset) or a styrenic block copolymer.

For some applications (for example, healthcare/medical applications) it is preferable that the elastomeric material be permeable to moisture vapor. Preferably, the moisture vapor transmission rate (MVTR) of the elastomeric material is at least about 400 g water/$m^2$/24 hours (more preferably, at least about 800; even more preferably, at least about 1600; most preferably, at least about 2000) when measured using a water method according to ASTM E-96-00.

Composite materials can be provided in any suitable manner. Generally, making or providing the composite material involves distributing the conductive particles and at least partially embedding the conductive particles in the elastomeric material. For example, the particles can first be distributed on a surface and the elastomeric material coated over, pressed onto, or laminated to the layer of particles. The surface of the particles are distributed onto can be a layer of the force sensing membrane, for example one of the conductors, or a carrier substrate that is removed after the particles are embedded into the elastomeric material. As another example, the particles can be dispersed in the elastomeric material and the resulting composite can be coated to form the composite material. As still another example, the elastomeric material can be provided as a layer, for example by coating, and then the conductive particles can be distributed on the layer of elastomeric material. The conductive particles can be embedded by pressing the particles into the layer of elastomeric material, with optional heating of the elastomeric material to allow the elastomeric material to soften, or by distributing the particles on, and optionally pressing the particles into, the elastomeric material layer when the elastomeric material is in an uncured or otherwise softened state and subsequently hardening the elastomeric material layer by curing, cooling, or the like. Thermal, moisture, and light cure reactions can be employed, as well as two part systems.

Methods of dispersing the conductive particles include, for example, those disclosed in U.S. Patent App. Pub. No. 03/0129302 (Chambers et al.), which is herein incorporated by reference in its entirety. Briefly, the particles can be dispensed onto a layer of the elastomeric material in the presence of an electric field to help distribute the particles as they randomly land on the layer. The particles are electrically charged such that they are mutually repelled. Therefore, lateral electrical connections and particle agglomeration are substantially avoided. The electric field is also used to create attraction of the particles to the film. Such a method can produce a random, non-aggregating distribution of conductive particles. The particles can be applied at a preselected density with a relatively uniform (number of particle per unit area) distribution of particles. Also, the web can be buffed to further aid in the particle distribution.

Other methods of dispersing the conductive particles can also be used. For example, the particles can be deposited in the pockets of micro-replicated release liners as disclosed in International Pub. WO 00/00563, which is herein incorporated by reference in its entirety. The elastomeric material would then be coated on or pressed against this particle-filled liner.

Any other method for distributing or dispersing the particles can be used provided that the particles are so distributed in the composite material that substantially all electrical contacts made between the conductors of the force sensing membrane are through one or more single particle contacts. As such, care should be taken to reduce or eliminate the occurrence of stacked particles in the composite (that is, two or more particles having overlapping positions in the thickness direction of the composite).

The methods used to place particles onto the medium should ensure that the contact between particles in the in-plane (x-y) direction is minimized. Preferably, no more than two particles should be in contact (for example, in a 30 $cm^2$ area). More preferably, no two particles are in contact with each other (for example, in a 30 $cm^2$ area). This will prevent any electrical shorting in the in-plane direction due to particle contact, and is especially preferred when the application requires multiple closely spaced electrodes.

FIGS. 3(*a*), (*b*), (*c*), and (*d*) illustrate the use of a force sensing membrane of the invention in which electrical contact is achieved by physical contact through one or more single particles. Force sensing membrane 300 includes a first conductor 310, a second conductor 320, composite material 330 comprising conductive particles 340 in an elastomeric layer 350 disposed between the conductors, and means for measuring dynamic electrical response across the force sensing membrane 360. As shown in FIG. 3(*a*), when no pressure is applied between the conductors, the conductors 310 and 320 remain electrically isolated by the elastomeric layer 350. As shown in FIG. 3(*b*), when sufficient pressure P is applied to the first conductor 310, an electrical contact can be made between the conductors 310 and 320 via single particle contacts. Single particle contacts are those electric contacts between the first and second conductors where one or more single conductive particles individually contact both the first and the second conductors. As shown in FIG. 3(*c*), when more pressure P' is applied to the first conductor 310, the elastomeric layer 350 further compresses and more single particle contacts can be made. As shown in FIG. 3(*d*), when all pressure is removed, the elastomeric layer 350 returns to substantially its original dimensions and no electric contacts are made.

The conductive particles can have a size distribution such that all the particles are not identical in size (or shape). In these circumstances, the larger conductive particles can make electrical contact before, or even to the exclusion of, smaller neighboring particles. Whether and to what extent this occurs depends on the size and shape distribution of the particles, the presence or absence of particle agglomeration, the loading density and spatial distribution of the particles, the ability for the movable conductor (or movable conductor/substrate combination) to flex and conform to local variations, the deformability of the particles, the deformability of the elastomeric material in which the particles are embedded, and the like. These and other properties can be adjusted so that a desirable number of single particle electrical contact per unit are made when sufficient pressure is applied between the first and second conductors. Properties can also be adjusted so that a desirable number of single particle electrical contact per unit are made when at one given amount of pressure versus a different amount of force/pressure applied between the first and second conductors.

In some embodiments, it can be preferable for the particle size distribution to be relatively narrow, and in some circumstances it can be preferable that all the particles are substantially the same size. In some embodiments, it can be desirable to have a bimodal distribution of particle sizes. For example, it can be desirable to have two different types of particles, larger particles and smaller particles, dispersed in the composite material.

Figure 4:
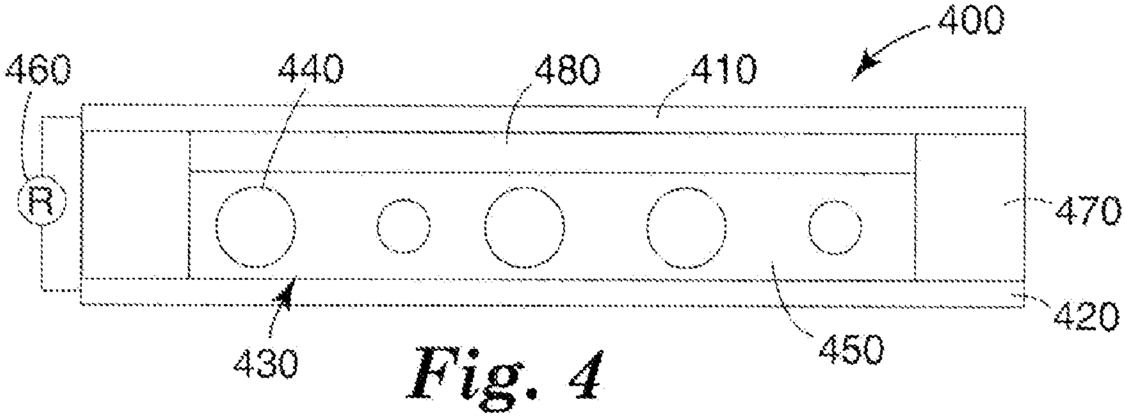
FIG. 4 is a schematic side view of another embodiment of a force sensing membrane of the invention.

FIG. 4 shows another embodiment of a force sensing membrane of the invention. Force sensing membrane 400 includes a first conductor 410, composite material 430 comprising conductive particles 440 in an elastomeric layer 450 disposed on a second conductor 420, and means for measuring dynamic electrical response across the force sensing membrane 460. Spacers 470 create a gap 480 (for example, an air gap) between the composite material 430 and the first conductor 410. Adding a gap of air between the composite material and a conductor changes the sensitivity of the force sensing membrane, and can thus be useful for tailoring the sensor to specific applications. Alternatively, the gap can be filled with a non-conducting filler material. Filling the gap can provide advantages such as increased durability in force sensing membranes that have conductors that are prone to cracking and flaking (for example, transparent conductive layers) due to the protection that a filler material provides.

Force sensing membranes of the invention can also be tailored to specific applications by embossing the elastomeric layer (for example, to provide a microreplicated surface). Embossing the elastomeric layer can allow air to move freely in and out of the membrane, and can thus lower the activation force of the membrane. Embossing can also help prevent shorting. Alternatively, microspheres (for example, Expancel™ microspheres from Akzo Nobel) can be dispersed in the elastomeric layer.

Figure 5A:
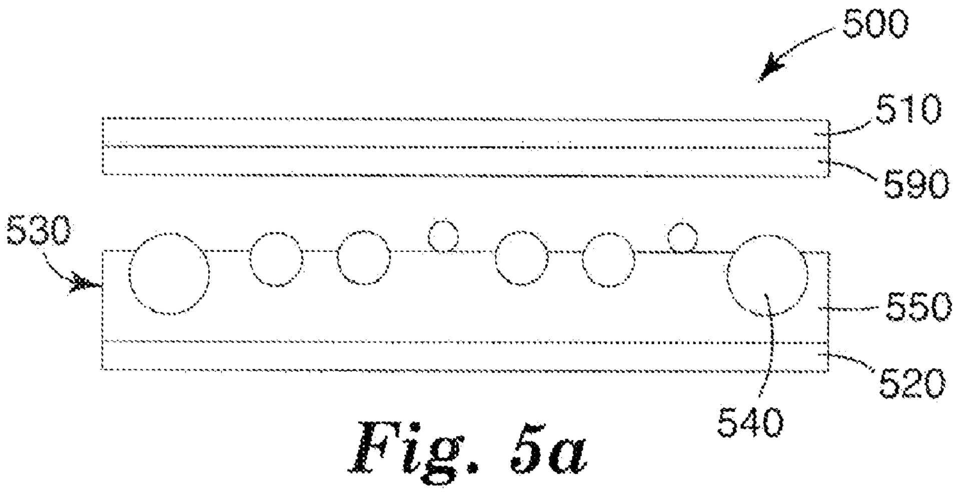
FIGS. 5(*a*) and (*b*) are schematic side views of another embodiment of a force sensing membrane of the invention.
Figure 5B:
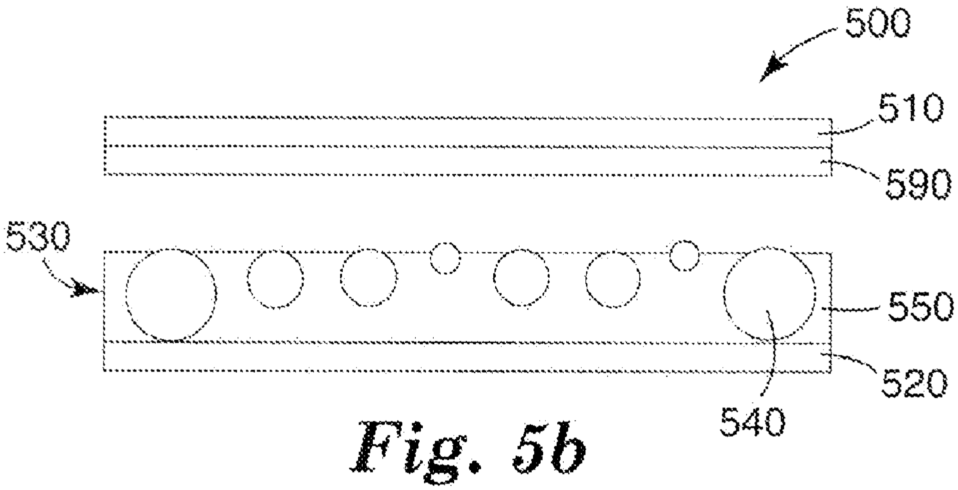

FIGS. 5(*a*) and 5(*b*) show embodiments of force sensing membrane according to the present invention that have a two-layer construction. In FIG. 5(*a*), force sensing membrane 500 includes an elastomeric layer 590 disposed on a first conductor 510, and a composite layer 530 comprising conductive particles 540 in an insulating material 550 disposed on a second conductor 520. Means for measuring dynamic electrical response across the force sensing membrane (not shown) can be electrically connected to the force sensing membrane. Preferably, the thickness of the composite layer is less than the average conductive particle size. The elastomeric layer disposed on the first conductor can help prevent electrical shorts (from unexpected electrode-particle-electrode electrical contacts) from occurring due to the composite layer being too thin.

In FIG. 5(*b*), the conductive particles 540 have been compressed down (for example, by passing through a roll nip) so that at least some of them are always in contact with the second conductor 520. When the particles are nipped down and the thickness of the composite layer is controlled to be less than the average particle size, the activation force (that is, the force required to electrically connect the first and second conductors) is controlled by the thickness and properties of the elastomeric layer. The properties of the insulating material and the conductive particles of the composite layer have relatively little effect on the activation force. Thus, the force sensing membrane can be designed to have a particular activation force.

The insulating material can be any insulating, film-forming, curable material. The insulating material can be an elastomeric or non-elastomeric material. The insulating material can comprise, for example, urethanes, epoxies, acrylates, polyesters, polyolefins, polyamides, and the like, and mixtures thereof. Preferably, the insulating material is an elastomeric material that is capable of returning to substantially its original dimensions on release of pressure. More preferably, the insulating material comprises an elastomeric material that has a substantially constant G' (in its fully cured state if a curable material) between about 0° C. and about 100° C.; most preferably,.between about 0° C. and about 60° C. Preferably,the elastomeric material has a G' between about $1\times10^3$ Pa and about $9\times10^5$ Pa and a loss tangent (tan delta) between about 0.01 and about 0.60 at 1 Hz at 23° C. It is also preferable that the elastomeric material be self-healing.

In the two-layer force sensing membranes of the invention, the elastomeric layer or the insulating material layer, or both, can be embossed.

Figure 6:
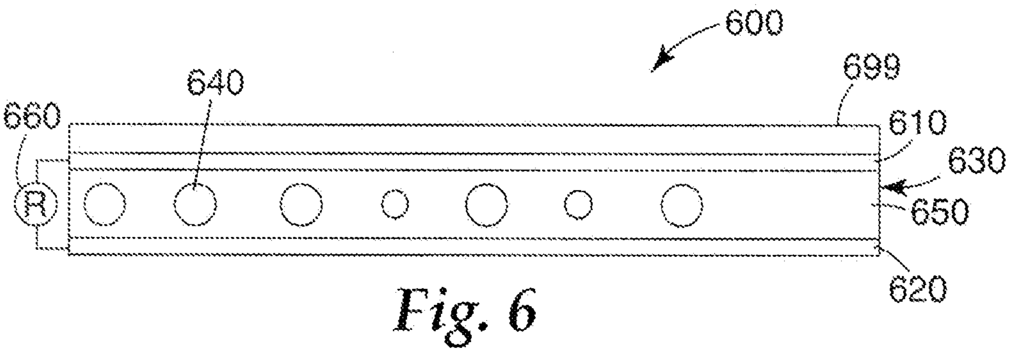
FIG. 6 is a schematic side view of an embodiment of a force sensing membrane of the invention comprising an overlay layer.

The force sensing membranes of the invention can optionally comprise an overlay layer (for example, a plastic film or a foam layer) on one or both of the conductors. FIG. 6 shows, for example, force sensing membrane 600, which comprises an over layer 699 on first conductor 610. Typically, overlay layers are less than about 5 mm thick (preferably, less than about 2 mm thick) so that they do not affect the response of the force sensing membrane. Overlay layers are particularly useful when using force sensing membranes in medical applications (for example, to monitor pressure to prevent bedsores, diabetic foot ulcers, or excessive pressure under casts). Examples of useful overlay layers in medical pressure sensing applications include foam insoles for shoes, bed sheets, bandages, and socks.

The force sensing membranes of the invention can also optionally be encapsulated in a suitable material to provide water/moisture resistance.

The force sensing membranes of the invention are useful in many applications. For example, the force sensing membranes of the invention can be useful in healthcare applications such for alerting of excessive pressure under casts, or for monitoring pressure for the prevention of bedsores and diabetic foot or leg ulcers. Preferably, if the force sensing membranes of the invention will be in contact or close proximity to a patient's skin, they are permeable to moisture vapor to allow moisture to evaporate away from the skin.

Figure 7:
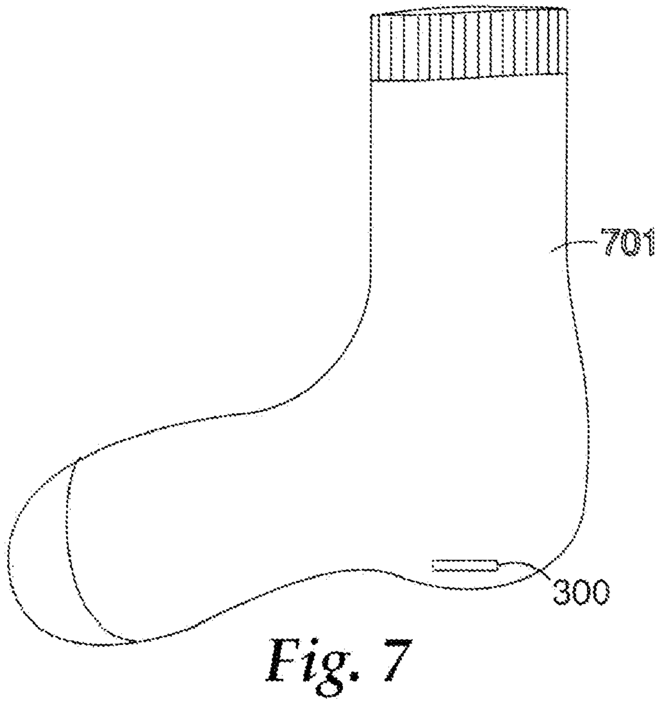
FIG. 7 is a dragrammatic sectional view of force sensing membrane of the invention incorporated into a sock.

Many individuals, for example, with diabetes experience poor sensation in the lower extremities as the disease progresses. Typically, these individuals use only visual observation to determine whether excessive pressure or skin ulceration is occurring on the skin of the foot. Such ulcers are usually the result of pressure and/or shear forces applied to a particular point on the foot through standing or walking over time. The force sensing membranes of the present invention allow for pressure assessment of the foot. For example, a force sensing membrane of the invention can be incorporated into (for example, sewn to, knitted into, adhesively or thermally bonded to, attached to by a hook and loop device, inserted into a pocket, or incorporated into by any suitable means) a sock, bandage, or insole to measure pressure on the foot area of interest. FIG. 7 show force sensing membrane 300 incorporated into the heel portion of a sock 701 to measure pressure on the heel of the user's foot, although any embodiment(s) of force sensing membrane of the invention can be incorporated into a sock. The membrane can be electrically connected to a microprocessor or discrete logic for data logging. The force sensing membrane can also be electrically connected to a signal processing unit to provide an audio, visual, or sensory (for example, vibration) response when a specified pressure threshold has been exceeded.

Figure 8:
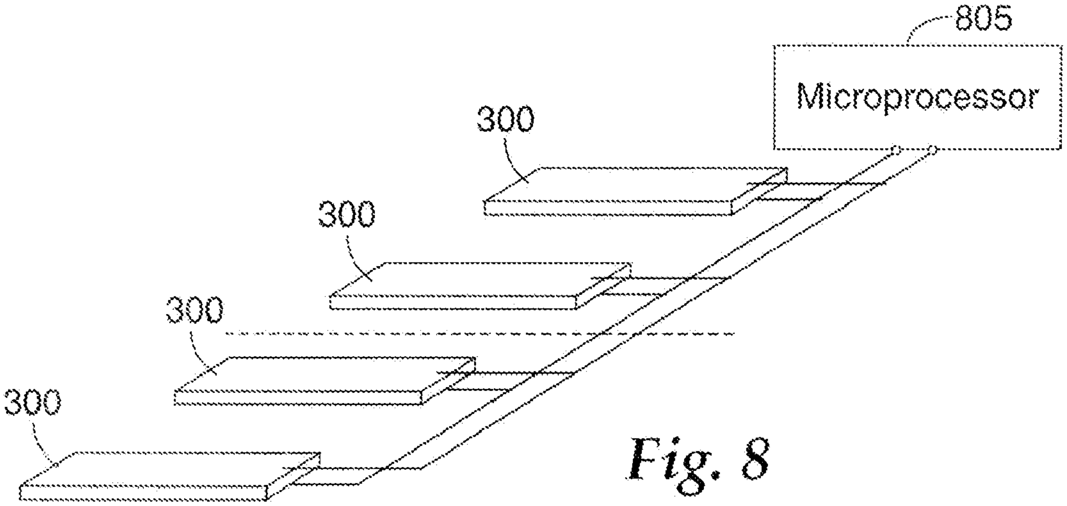
FIG. 8 is a schematic perspective of an array of a plurality of the force sensing membranes of invention.

Arrays comprising a plurality of force sensing membranes of the invention can also be useful in healthcare applications. For example, an array of force sensing membranes can be arranged at various locations in a bed to monitor pressure for the prevention of bedsores. The force sensing arrays can be uniformly or non-uniformly spaced. FIG. 8 show an example of an array comprising a plurality of force sensing membranes of the invention 300 connected to microprocessor 805, although any embodiment(s) of force sensing membrane of the invention can be incorporated into an array.

Force sensing membranes of the invention are also useful, for example, in automotive applications (for example in seat sensors or for air bag deployment), consumer applications (for example, as load/weight sensors or in "smart systems" to sense the presence or lack thereof of an article on a shelf), manufacturing applications (for example, to monitor nip roll pressure), sporting applications (for example, to monitor speed, force or impact, or as grip sensors on clubs or racquets), and the like.

EXAMPLES

Objects and advantages of this invention are further illustrated by the following examples, but the particular materials and amounts thereof recited in these examples, as well as other conditions and details, should not be construed to unduly limit this invention.

Materials

Materials used in the examples are shown in the table below. The composition of the material is expressed in phr (parts per hundred parts of rubber). UC Silicone is vinyl modified poly dimethyl siloxane commercially available as Y-7942 from Crompton (Greenwich, Conn.); Pt catalyst is a dispersion of platinum fine powder available from Aldrich Canada (Oakville, ON, Canada) dispersed in the UC Silicone at 1 phr; DC1107 is a cross linker available from Dow Corning (Midland, Mich.); DM is dimethyl maleate commercially available from Fischer Scientific (Ottawa, ON, Canada); and silica is fumed silica available as M3 Cab-o-sil from Cabot Corporation (Tuscon, Ill.).

| | UC Silicone (phr) | Pt catalyst (phr) | DC1107 (phr) | DM (phr) | Silica (phr) |
|---|---|---|---|---|---|
| SMHV 3 | 100 | 0.33 | 1.10 | 0.90 | 0 |
| SMHV-3S | 100 | 0.33 | 2.10 | 0.90 | 2 |
| SMHV-9 | 100 | 0.33 | 0.39 | 0.26 | 0 |
| SMHV-16 | 100 | 0.33 | 0.80 | 0.60 | 0 |

G165730N was blend of Kraton™ G1657 (available from Kraton Polymers, Houston, Tex.) and 30 phr of Nyflex 22 b processing oil (available form Nynas USA Inc., Houston, Tex.).

Testing Unit

The sensor was evaluated using an apparatus called the force apparatus, which consists of a load cell (model LCFD-1 kg from Omega Engineering Inc., Hartford, Conn.) that measures the applied normal force on the sensor.

The sensor to be evaluated was placed on the load cell horizontally and secured with tape. A pneumatically operated cylinder (model E9X 0.5N from Airpot Corporation, Norwalk, Conn.) connected to two valves (model EC-2-12 from Clippard Instrument Laboratory, Cincinnati, Ohio), under computer control with compressed air at about 275 kPa, was located directly above the load cell. By opening and closing the valves in a sequence, the cylinder was moved downwards in pre-determined constant steps to increase the force on the sensor which was placed on the load cell. The load cell was connected to a display device (Model DP41-S-A available form Omega Engineering Inc. Hartford, Conn.) that displayed the applied force. Once a pre-determined limit of the force was reached, the air was vented from the system using a vent valve to reduce the force on the sensor.

The conductors of the sensor were connected to a multimeter to record the sensor's electrical response. The resistance of the sensor was measured using a digital multimeter (Keithley Model 197A microvolt DMM from Keithley Inc., Cleveland, Ohio). The applied force as read from the load cell and the electrical response of the sensor as read from the multimeter were captured with a PC based data acquisition system. The force applied ranged from 0.1 to 10 newton, and the application of force was done at a rate of about 0.028 newton/s (1.67 newton/min).

Explanation of N-Value

When the resistance across a force sensor is measured, the response of resistance versus force can be plotted in a log-log plot. In a certain range, the power law relation can be given by the formula: resistance=$A/F^n$, where A is a constant, F is force, and n (the "n-value") is the slope of the best-fit line (determined by linear regression) on log-log plot. The n-value indicates the sensitivity of the sensor. The higher the n-value, the larger the change in resistance of the sensor for a given change in applied force. A lower n-value means a smaller change in resistance for the same change in applied force.

Explanation of $R^2$

As described above, the response of resistance versus force can be plotted in a log-log plot, and the best-fit line can be determined. As is known in the art, the degree of fit (or measure of goodness of fit) of the linear regression can be indicated by an $R^2$ value. $R^2$ is a fraction between 0.0 and 1.0. The closer $R^2$ is to 1.0, the better the fit. When $R^2$ is 1.0, all plotted points lie exactly in a straight line with no scatter.

Example 1

Indium tin oxide (ITO) coated glass fibers, commercially available as SD220 from 3M Company (St. Paul. Minn.), were dispensed over an uncured, knife coated layer (about 25 microns thick) of 734-silicone rubber (Dow Corning, Midland, Mich.). A particle dispenser as described in U.S. Patent App. Pub. No. 03/0129302 (Chambers et al.) was used to dispense the particles. After the silicone rubber was cured at room temperature over night, a small piece (approximately 20 mm×20 mm) of the particle-embedded silicone rubber was cut and was transferred onto a copper foil tape (3M 1190, 3M Company, St. Paul, Minn.) and secured using 3M Scotch™ tape by applying the tape around the edges of the particle-embedded silicone. Another copper foil tape was placed on top of this ensuring that the two copper foils did not come in contact with each other. The two copper foils were electrically isolated from each by the Scotch™ tape.

Figure 9:
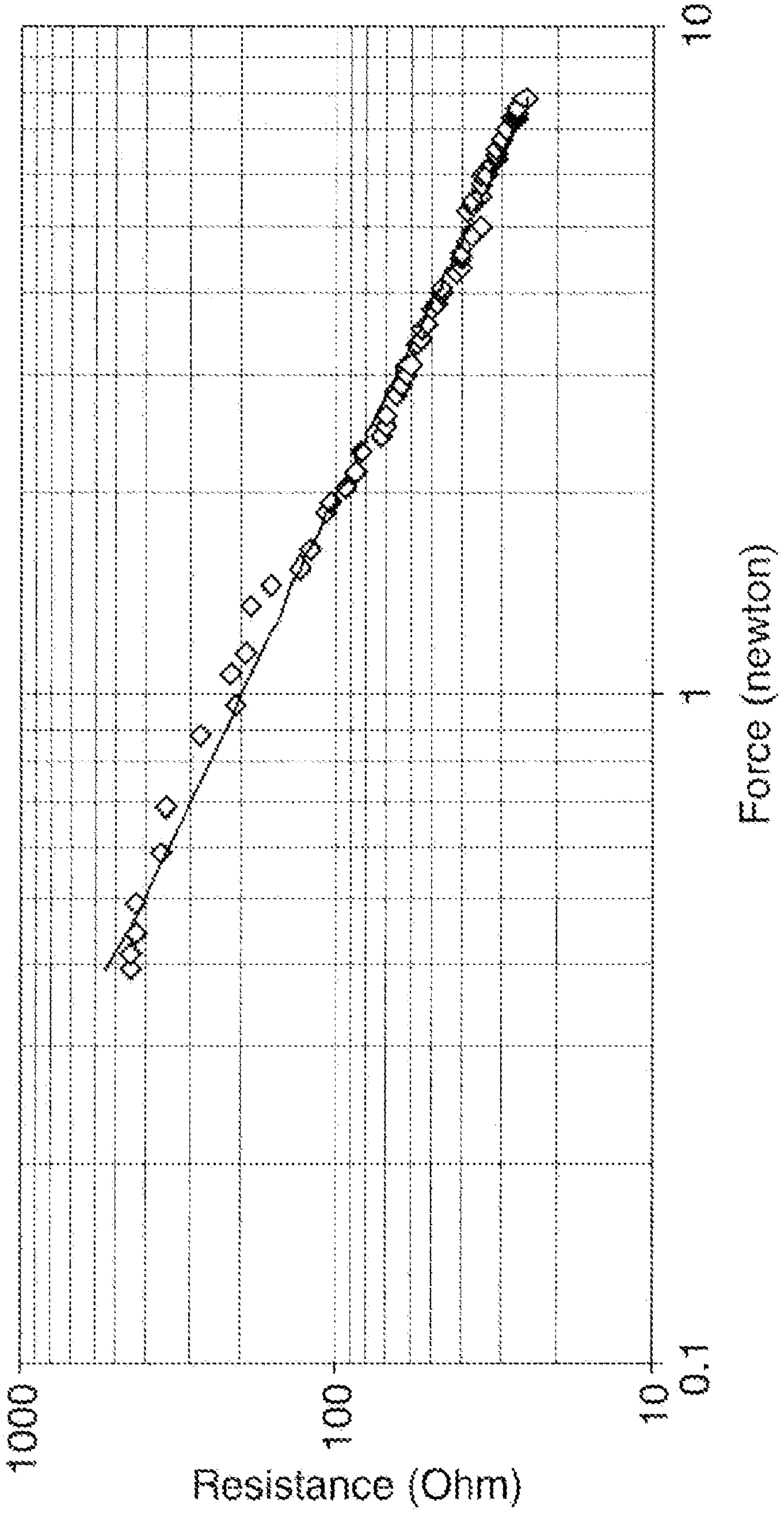
FIG. 9 is a plot of force versus resistance on a log-log scale for a force sensing membrane of the invention described in Example 1.

The resulting sensor was tested using the force apparatus testing unit described above. The test data plotted on a log-log plot is shown in FIG. 9. The n-value of the best-fit line is 1.02 and $R^2$ is 0.992.

Example 2

The sensor described in Example 1 was tested for its durability by repeating loading and unloading cycles as follows.

A Life cycle Test System (model 933A from Tricor Systems Inc., Elgin, Ill.) was used to test the sensor in terms of endurance. The test system has a pneumatically controlled cylinder, which pressed the sensor at a selected rate while counting the up/down number of cycles. The multimeter connected across the sensor measured the voltage appearing across it. The sensor was tested for 1000 cycles and was seen to produce approximately the same voltage versus the force curves for each cycle.

Example 3

The sensor described in Example 1 was connected to a LED (light emitting diode) bar graph display circuit. Applying a force on the sensor by pressing on it with a finger caused the display to light up a segment of the LED in response to the applied force.

Example 4

The characteristics of sensors essentially the same as that described in Example 1 were measured as described above using the force apparatus testing unit after placing different overlay materials on the sensor. The overlay material was simply placed on top of the sensor. The overlays included:

1. Melinex™ polyester film (DuPont, Hopewell, Va.); and
2. Equate™ foam cushion insoles, 140 mil thick (National Home Products Ltd., Downsview, Ontario, Canada)

The sensor characteristics were essentially unchanged on the application of the overlayers as shown in Table 1 (polyester film) and Table 2 (foam insoles). The n-values show that placing different overlayers on top of the sensor did not significantly alter the sensitivity of the sensor.

TABLE 1

Polyester Overlayer

| | Condition | n | $R^2$ |
|---|---|---|---|
| 1 | No overlayer | 1.48 | 0.960 |
| 2 | PET 10 mil overlayer | 1.58 | 0.987 |
| 3 | PET 14 mil overlayer | 1.49 | 0.979 |
| 4 | PET 20 mil overlayer | 1.48 | 0.984 |

TABLE 2

Foam Insoles Overlayer

| | Condition | n | $R^2$ |
|---|---|---|---|
| 1 | No overlayer | 1.15 | 0.990 |
| 2 | With foam overlayer | 1.12 | 0.933 |

Example 5

To analyze the affect of an air gap between the conductor and the composite material layer, 3M 810 tape (St. Paul, Minn.) was used to build up a space between the silicone rubber layer and the top copper foil tape of a sensor essentially the same as that described in Example 1. The sensor was tested using the force apparatus testing unit with air gap thicknesses listed below. The results (in Table 3) show that as the air gap was increased, the sensitivity of the sensor was increased as shown by the increased n-value.

TABLE 3

| | Spacing (micron) | n | $R^2$ |
|---|---|---|---|
| 1 | 0 | 1.7 | 0.982 |
| 2 | 187.5 | 1.7 | 0.982 |
| 3 | 375 | 3.3 | 0.961 |
| 4 | 562.5 | 4.2 | 0.907 |

Example 6

Sensors were prepared essentially as described in Example 1 except with the elastomer shown below and with indium tin oxide (ITO) coated glass beads instead of the fibers. Indium tin oxide (ITO) coated glass beads, commercially available as SD110 from 3M Company (St. Paul. Minn.), were dispensed over an uncured, knife coated layer of the elastomer indicated below about 1 mil (25 micron) thick. The sensors were tested using the force apparatus testing unit. The activation force of the sensors ($F_i$), defined as the force necessary to show a resistance of 1 kOhm was also recorded.

TABLE 4

| | Elastomer | G' (Pa) | Tan delta | $F_i$ (kg) | n |
|---|---|---|---|---|---|
| 1 | Dow Corning 734 | $2.0 \times 10^5$ | 0.05 | 0.150 | 1.4 |
| 2 | SMHV-3S | $2.0 \times 10^5$ | 0.01 | 0.150 | 1.1 |
| 3 | G5730N | $2.5 \times 10^5$ | 0.15 | 0.250 | 2.4 |

Example 7

An elastomer of interest (shown in Table 5 as "bottom" elastomer) was knife coated onto a conducting layer of ITO coated polyester to obtain a 37.5 micron (1.5 mil) thickness. ITO coated glass beads were dispensed onto the elastomer layer at roughly 1.5 g/ft$^2$ density. The particles were embedded into the elastomeric layer by nipping the coated elastomer between two rubber rolls. This coated elastomer was cured in air at 120° C. for 5 minutes in an oven. On a separate conductive layer of ITO coated polyester, an elastomer (shown in Table 5 as "top" elastomer) was knife coated to a thickness of 12.5 micron(0.5 mil), and the elastomer was cured for 5 minutes in air at 120° C. in an oven. The two layers were brought together such that the elastomers were facing each other, and were then taped together with packaging tape (3M 3710 tape, 3M Company, St. Paul, Minn.). Electrical connections were made to the two conducting layers using copper electrical foil tape (3M 1190, 3M Company, St. Paul, Minn.) and the sensors were tested using the force apparatus testing unit. The results are shown in Table 5.

The G' and tan delta of the top elastomer layer with the activation force ($F_i$) of each sensor, defined as the force necessary to show a resistance of 1 kohm, and the n-value are shown in the Table. Higher modulus elastomers showed high activation force and higher n-values, thus higher sensitivity to force.

TABLE 5

| | Elastomer (top/bottom) | Top G' (Pa) | Top Tan delta | $F_i$ (kg) | n |
|---|---|---|---|---|---|
| 1 | SMHV16/SMHV16 | $0.5 \times 10^5$ | 0.04 | 0.030 | 0.97 |
| 2 | SMHV16/G5730N | | | 0.030 | 0.94 |
| 3 | SMHV3/SMHV16 | $2.0 \times 10^5$ | 0.01 | 0.120 | 1.4 |
| 4 | SMHV3/G5730N | | | 0.090 | 1.3 |

The referenced descriptions contained in the patents, patent documents, and publications cited herein are incorporated by reference in their entirety as if each were individually incorporated.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A device comprising a force sensing membrane incorporated into a sock, bandage, or insole, said force sensing membrane comprising:

(a) a first conductor that is movable toward a second conductor;

(a) a second conductor;

(c) a composite material disposed between the first and second conductors for electrically connecting the first and second conductors under application of sufficient pressure therebetween; and (d) means for measuring dynamic electrical response across the force sensing membrane, the composite material comprising conductive particles at least partially embedded in an elastomeric layer, the conductive particles having no relative orientation and being disposed so that substantially all electrical connections made between the first and second conductors are in the z direction, and the elastomeric layer being capable of returning to substantially its original dimensions on release of pressure.

2. The device of claim 1 wherein the elastomeric layer comprises an elastomeric material that has a substantially constant G' between about 0° C. and about 100° C.

3. The device of claim 2 wherein the elastomeric layer comprises an elastomeric material that has a substantially constant G' between about 0° C. and about 60° C.

4. The device of claim 1 wherein the elastomeric layer comprises an elastomeric material that has a G' between about $1\times10^3$ $Pa^2$ and about $9\times10^5$ $Pa^2$and a loss tangent between about 0.01 and about 0.60 at 1 Hz at 23° C.

5. The device of claim 1 wherein the elastomeric layer comprise an elastomeric material that is self-healing.

6. The device of claim 1 wherein the elastomeric layer comprises an elastomeric material selected from the group consisting of silicones and styrenic block copolymers.

7. The device of claim 6 wherein the elastomeric layer comprises a silicone.

8. The device of claim 6 wherein the elastomeric layer comprises styrene-isoprene-styrene block copolymers or styrene-ethylene/butylene-styrene block copolymers.

9. The device of claim 1 wherein the conductive particles are disposed so that substantially all electrical connection made between the first and second conductors are through single particles.

10. The device of claim 9 wherein the conductive particles are disposed so that no more than two particles are in contact with each other.

11. The device of claim 10 wherein no two particles are in contact with each other.

12. The device of claim 1 wherein the conductive particles comprise a metal.

13. The device of claim 1 wherein the conductive particles comprise core particles having a conductive coating.

14. The device of claim 13 wherein the core particles comprise glass particles or hollow parties.

15. The device of claim 13 wherein the conductive coating comprises a conductive oxide.

16. The device of claim 1 wherein the conductive particles are substantially spherical.

17. The device of claim 1 wherein the conductive particles at are fibers.

18. The device of claim 1 further comprising an overlay layer disposed on the first, the second conductor, or both.

19. The device of claim 1 wherein there is an gap between the composite material and one of the first and second conductors.

20. The device of claim 1 wherein the thickness of the membrane is between about 1 mm about 50 mm.

21. A forces sensing membrane comprising:

(a) a first conductor comprising a conductive sheet, foil or coating;

(b) a second conductor comprising a conductive sheet, foil or coating;

(c) a composite material layer disposed between the first and second conductors for electrically Connecting the first and second conductors under application of sufficient pressure therebetween, said composite material layer comprising conductive particles embedded in an insulating material; and (d) a non-conducting layer positioned between (i) the composite material and (ii) the first or second conductor, wherein said non-conducting layer comprises (1) an air gap or (2) an elastomeric layer substantially free of conductive particles;

at least one of the first and second conductors being movable toward the other conductor, the conductive particles having no relative orientation and being disposed so that substantially all electrical connections made between the first and second conductors are in the z direction, and the elastomeric layer, when present, being capable of returning to substantially its original dimension on release of pressure.

22. The force sensing membrane of claim 21 wherein the insulating material is capable of returning to substantially its original dimensions on release of pressure.

23. The force sensing membrane of claim 21 wherein one or both of the elastomeric layer and the insulating material comprises an elastomeric material that has a substantially constant G' between about 0° C. and about 100° C.

24. The force sensing membrane of claim 21 wherein one or both of the elastomeric layer and the insulating material comprises an elastomeric material that has a substantially constant G' between about 0°0 C. and about 60° C.

25. The force sensing membrane of claim 21 wherein one or both of the elastomeric layer and the insulating material comprises an elastomeric material that has a G' between about $1\times10^3$ $Pa^2$ and about $9\times10^5$ $Pa^2$ and a loss tangent between about 0.01 and about 0.60 at 1 Hz at 23° C.

26. The force sensing membrane of claim 21 wherein both of the elastomeric layer and the insulating material comprises an elastomeric material that is self-healing.

27. The force sensing membrane of claim 21 wherein the conductive particles are disposed so that substantially all electrical connections made between the first and second conductors are through single particles.

28. The force sensing membrane of claim 27 wherein the conductive particles are disposed so that no more than two particles are in contact with each other.

29. The force sensing membrane of claim 28 wherein no two particles are in contact with each other.

30. The force sensing membrane of claim 21 further comprising means for measuring dynamic electrical response across the force sensing membrane.

31. A device comprising the force sensing membrane of claim 21 incorporated into a sock, bandage, or insole.

32. A device comprising an array a plurality of the force sensing of claim 21.

33. A method of force sensing comprising applying pressure to the device of claim 1, and measuring the change in an electrical property across the force sensing membrane.

34. A method of force sensing comprising:

(a) electrically connecting the first and second conductors of the force sensing, membrane of claim 21 to a means for measuring dynamic electrical response, and.

(b) measuring an electrical response across the force sensing membrane.

35. The device of claim. 1 wherein the force sensing membrane is permeable to moisture vapor.

36. The force sensing membrane of claim 21 wherein said non-conducting layer comprises an air gap.

37. The force sensing membrane of claim 21 wherein said non-conducting layer comprises an elastomeric layer, and said conductive particles are wholly embedded within said composite material layer.

38. The force sensing membrane of claim 21 wherein said first and second conductors have opposing surface areas substantially equal to one another.

39. The force sensing membrane of claim 21 wherein the force sensing membrane is permeable to moisture vapor.

40. A force sensing membrane comprising:

(a) a last conductor that is movable toward a second conductor;

(b) a second conductor;

(c) a composite material disposed between the first and second conductors for electrically connecting the first and second conductors under application of sufficient pressure therebetween, said composite material comprising conductive particles at least partially embedded in an insulating layer that is capable of returning to substantially its original dimensions on release, of pressure; and (d) measuring dynamic electrical response across the force sensing membrane;

wherein the three sensing membrane is permeable to moisture vapor.

41. The force sensing membrane of claim 40 wherein the force sensing membrane has a moisture vapor transmission rate (MVTR) of at least about 400 g water/$m^2$/24 hours when measured using a water method according to ASTM E-96-00.

42. The force sensing membrane of claim 40 further comprising an additional layer positioned between said composite material and said first or second conductor, said additional layer comprising a non-conducting layer comprising (1) an air gap (2) an elastomeric layer substantially free of conductive particles.

43. A device, comprising the force sensing membrane of claim 40 incorporated into a seek, bandage, or insole.

* * * * *

UNITED STATES PATENT AND TRADEMARK OFFICE
CERTIFICATE OF CORRECTION

PATENT NO. : 7,260,999 B2
APPLICATION NO. : 11/020289
DATED : August 28, 2007
INVENTOR(S) : Ranjith Divigalpitiya It is certified that error appears in the above-identified patent and that said Letters Patent is hereby corrected as shown below:

Column 2,
Line 48, delete "dragrammatic" and insert -- diagrammatic --, therefor.

Line 48, before "force" insert -- a --.

Column 9,
Line 59, delete "preferably,." and insert -- preferably, --, therefor.

Line 60, delete "Preferably,the" and insert -- Preferably, the --, therefor.

Column 10,
Line 44, delete "membrane" and insert -- membranes --, therefor.

Line 57, delete "show" and insert -- shows --, therefor.

Line 61, delete "membrane" and insert -- membranes --, therefor.

Column 14,
Line 42, delete "kohm," and insert -- kOhm, --, therefor.

Column 15,
Line 7, in claim 1, delete "(a)" and insert -- (b) --, therefor.

Line 30, in claim 4, delete "$Pa^2$and" and insert -- $Pa^2$ and --, therefor.

Line 33, in claim 5, delete "comprise" and insert -- comprises --, therefor.

Line 56, in claim 14, delete "parties." and insert -- particles. --, therefor.

Line 62, in claim 17, before "arc" delete "at".

Line 65, in claim 19, before "gap" insert -- air --.

UNITED STATES PATENT AND TRADEMARK OFFICE
CERTIFICATE OF CORRECTION

PATENT NO. : 7,260,999 B2
APPLICATION NO. : 11/020289
DATED : August 28, 2007
INVENTOR(S) : Ranjith Divigalpitiya It is certified that error appears in the above-identified patent and that said Letters Patent is hereby corrected as shown below:

Column 16,
Line 2, in claim 20, before “about” insert -- and --.

Line 3, in claim 21, delete “forces” and insert -- force --, therefor.

Line 10, in claim 21, delete “Connecting” and insert -- connecting --, therefor.

Line 27, in claim 21, delete “dimension” and insert -- dimensions --, therefor.

Line 39, in claim 24, delete “0°0” and insert -- 0° --, therefor.

Line 63, in claim 32, after “array” insert -- of --.

Line 64, in claim 32, after “sensing” insert -- membranes --.

Column 17,
Line 3, in claim 34, delete “sensing,” and insert -- sensing --, therefor.

Line 4, in claim 34, delete “and.” and insert -- and --, therefor.

Line 7, in claim 35, delete “claim.” and insert -- claim --, therefor.

Line 21, in claim 40, delete “last” and insert -- first --, therefor.

UNITED STATES PATENT AND TRADEMARK OFFICE

CERTIFICATE OF CORRECTION

PATENT NO. : 7,260,999 B2
APPLICATION NO. : 11/020289
DATED : August 28, 2007
INVENTOR(S) : Ranjith Divigalpitiya It is certified that error appears in the above-identified patent and that said Letters Patent is hereby corrected as shown below:

Column 18,
Line 5, in claim 40, delete "release," and insert -- release --, therefor.

Line 7, in claim 40, before "measuring" insert -- means for --.

Line 9, in claim 40, delete "three" and insert -- force --, therefor.

Line 20, in claim 42, before "(2)" insert -- or --.

Line 22, in claim 43, delete "device," and insert -- device --, therefor.

Line 23, in claim 43, delete "seek," and insert -- sock, --, therefor.

Signed and Sealed this

Fifth Day of August, 2008

JON W. DUDAS
*Director of the United States Patent and Trademark Office*